United States Patent

[11] 3,556,464

[72] Inventor David E. Griswold
 Corona Del Mar, Calif.
[21] Appl. No. 831,393
[22] Filed June 9, 1969
[45] Patented Jan. 19, 1971
[73] Assignee Griswold Controls
 Santa Ana, Calif.
 a corporation of California

[54] SELF-DRAINING PRESSURE ACTUATED VALVE
 13 Claims, 6 Drawing Figs.
[52] U.S. Cl.................................................. 251/46,
 251/64, 251/120
[51] Int. Cl.......................................F16k 31/385
[50] Field of Search.......................... 251/64, 46,
 43; 251/120

[56] References Cited
 UNITED STATES PATENTS
 1,646,640  10/1927  Daniel........................... 251/43X
 FOREIGN PATENTS
 126,836  0/1919  Great Britain................ 251/64

Primary Examiner—Arnold Rosenthal
Attorney—Lyon and Lyon

ABSTRACT: A pressure operated valve having a closure member and seat wherein the valve seat has a cylindrical bore which slidably receives the cylindrical outer surface of a guide element secured to the movable closure member and a spiral coil spring encircles an axial pin fixed to the valve seat which is slidably received by the guide element.

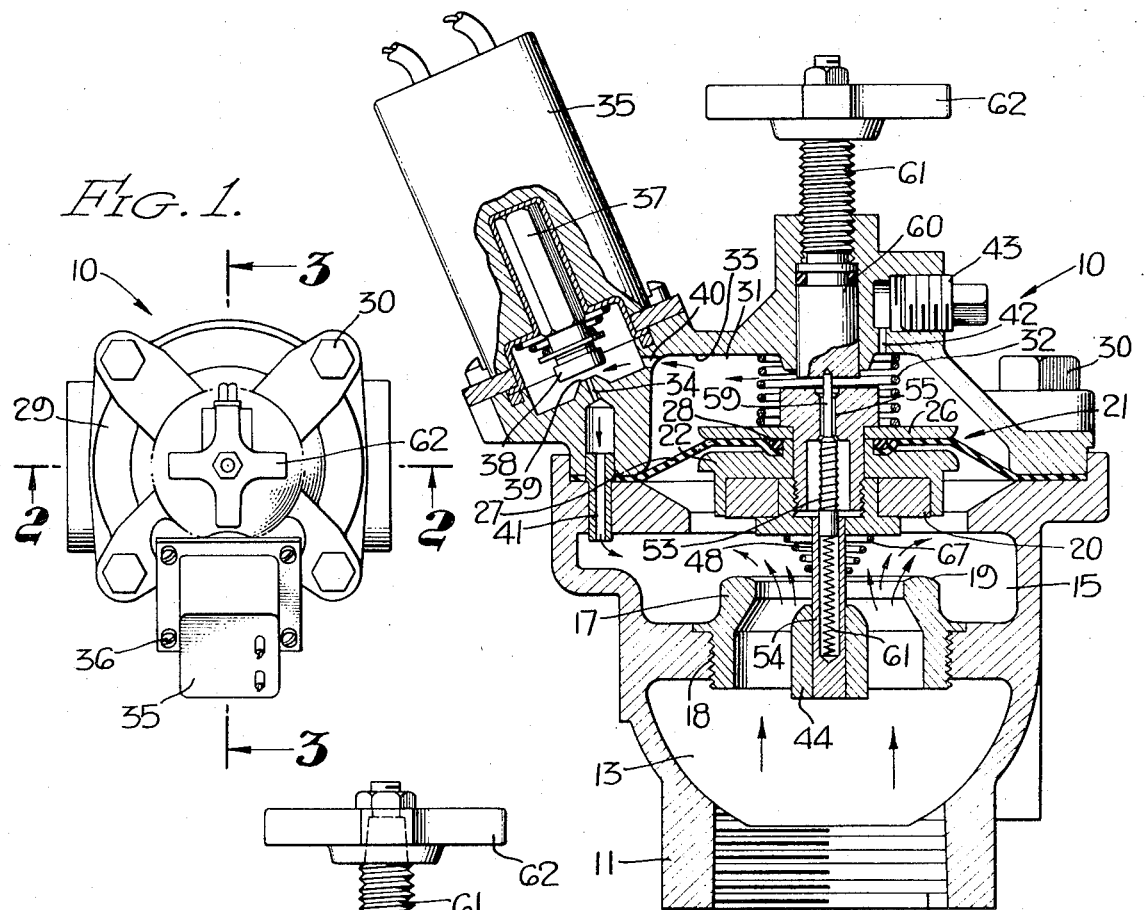
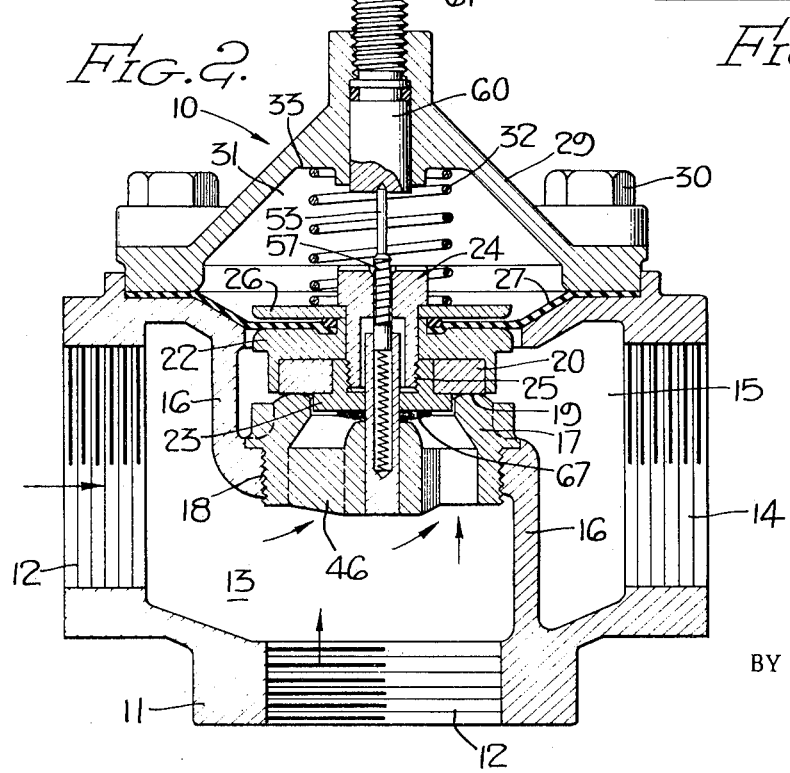

INVENTOR,
DAVID E. GRISWOLD
BY
Lyon & Lyon
ATTORNEYS ic
SELF-DRAINING PRESSURE ACTUATED VALVE This invention relates to an improvement over the disclosure of my prior U.S. Pat. No. 3,367,621 for Diaphragm Operated Valve Including an Adjustable Choke Passage. The improvement of the present invention permits substantially all of the fluid to be drained from the valve whenever the differential pressure across the valve is reduced below a predetermined intensity. Such a condition occurs, for example, when the valve is used in an irrigation system subject to subfreezing temperatures, in order to drain the system when required to prevent damage from freezing. The necessity for draining an irrigation system not only occurs prior to each winter season, but draining may also be required on a more frequent basis during marginal weather where irrigation is needed after a period of freezing temperatures, even though subsequent freezing temperatures may be encountered in the same seasonal period.

It is customary to provide for gravity draining of water from the sprinkler heads back through the lateral pipes and subsequently through the main lines of the irrigation system to some low point where provision is made for emptying the main lines to a sump or other drain area. Normally, only gravity head pressure is available to provide for draining of the system. However, in some cases, a pump capable of producing a negative suction head is provided to assist in draining. Because of this low pressure differential condition, it is desirable to provide a valve which will permit draining in either direction without requiring positive pressure for operation.

The improved pressure operated valve of this invention provides for positive opening and closing action under conditions where the system is under normal operating pressures, but when system pressure is removed, the valve will positively open sufficiently to provide for drainage. Once the system has been drained, the valve remains in draining position so that any new water which may enter the system as a result of intermittent thawing will pass through the valve and down to the system low point for draining. When system pressure is reapplied, the valve again operates for positive opening and closing action, as required.

Stated in other terms, in an irrigation system that includes the improved self-draining pressure operated valves, the individual valves directly respond to controlling signals to cause them to open or to remain closed whenever positive system pressures are available for irrigation purposes, and the opening and closing movements occur in response to the desired irrigation schedule. However, when system pressures no longer exist when the water supply is shut off to drain the system to a low pressure area, all of the improved valves will automatically move to the draining position and remain in that position until positive system pressures again apply, whereupon the valves return to their normal functioning condition.

Other and more detailed objects and advantages will appear hereinafter.

In the drawings:

FIG. 1 is a top plan view of a self-draining pressure actuated valve embodying this invention.

FIG. 2 is a transverse sectional elevation taken substantially on the line 2–2 as shown in FIG. 1.

FIG. 3 is a sectional elevation taken substantially on the line 3–3 as shown in FIG. 1.

Figure 4:
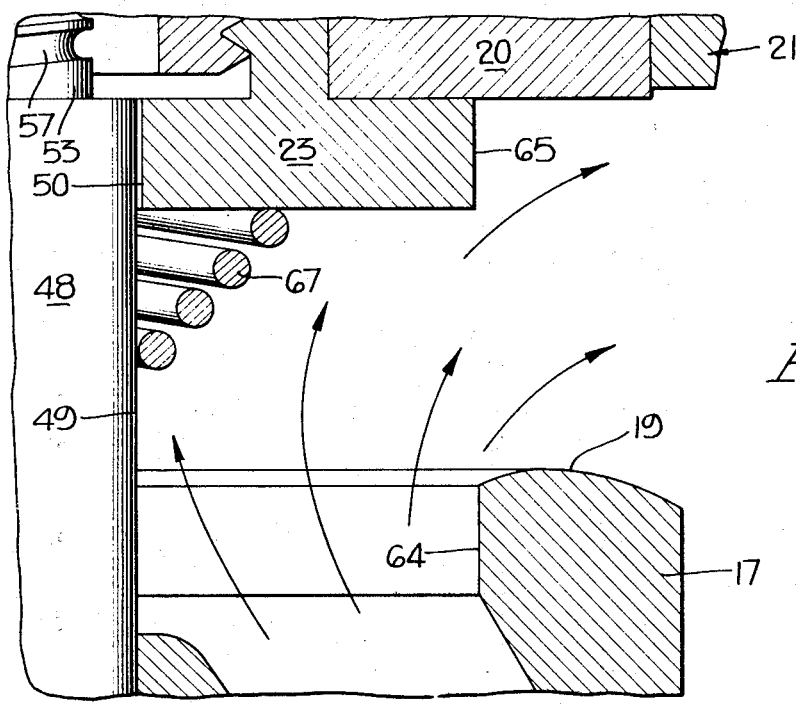

FIG. 4 comprises an enlargement of a portion of FIG. 3, the valve parts being shown in fully open position.

Figure 5:
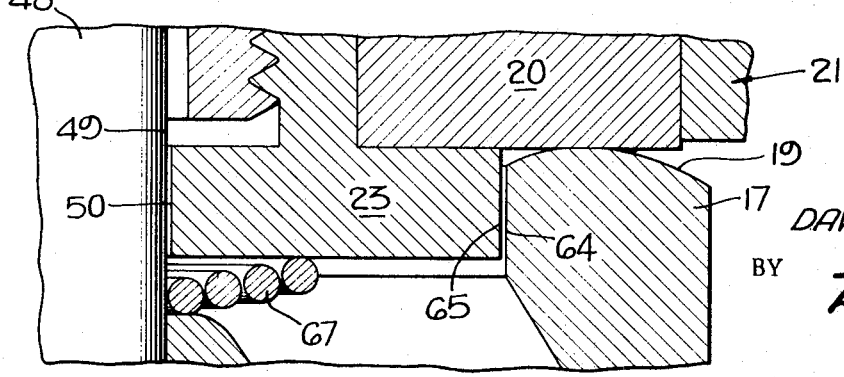

FIG. 5 is an enlargement of a portion of FIG. 2, the valve parts being shown in fully closed position.

Figure 6:
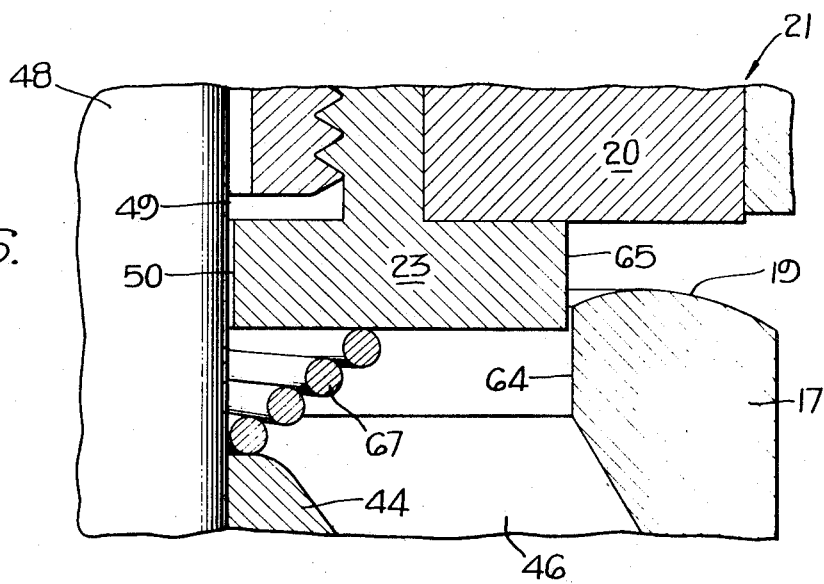

FIG. 6 is a view similar to FIGS. 4 and 5, showing the valve parts in the intermediate draining position.

Referring to the drawings, the valve assembly generally designated 10 includes a valve body 11 which is a combination globe or angle pattern having a pair of inlet openings 12 leading to an inlet chamber 13. An outlet opening 14 communicates with the outlet chamber 15 within the valve body 11. A stationary divider wall 16 separates the inlet chamber 13 from the outlet chamber 15, and a stationary valve seat member 17 is fixed on this wall 16 by means of threads 18. The valve seat member 17 has an annular horizontal valve seat face 19 adapted to be contacted by a sealing disc 20 carried on the movable closure member generally designated 21. This member 21 includes the disc retainer 22 and the guide element 23, which cooperate to hold the annular sealing disc 20 in position. A sleeve 24 is connected by threads 25 to the guide element 23. The sleeve 24 has a shoulder which engages the exposed face of the follower plate 26.

The inner periphery of the flexible diaphragm 27 is clamped by means of an O-ring 28 between the follower plate 26 and the disc retainer 22. The outer periphery of the diaphragm 27 is clamped between the lower portion of the body 11 and the upper portion or cover 29. Threaded fastenings 30 hold these two body portions in assembled relationship.

From this description it will be understood that when the valve parts are in the fully closed position, as shown in FIGS. 2 and 5, the sealing disc 20 engages the horizontal valve seat face 19 to prevent flow from the inlet chamber 13 to the outlet chamber 15. When the valve parts are in fully open position, as shown in FIGS. 3 and 4, the movable closure member 31 is spaced above the valve seat face 19 so that flow may take place in the direction of the arrows from the inlet chamber 13 to the outlet chamber 15. The diaphragm 27 serves to close the valve when pressure in the actuating chamber 31 reaches a predetermined intensity with respect to the upstream and downstream pressures. The valve spring 32 is a coil compression spring having one end engaging a shoulder 33 within the cover 29, the other end engaging the exposed surface of the follower plate 26. This valve spring 32 acts to move the valve toward fully closed position. The two-way pilot control solenoid valve 35 is mounted on the cover 29 by means of threaded fastenings 36. The movable armature 37 carries a valve head 38 adapted to close against a seat 39 to prevent flow through the vent port 40 from the chamber 31. When the pilot valve is open, flow of fluid from the actuating chamber 31 passes through the vent port 40 and through the discharge tube 41 into the outlet chamber 15. Flow through a second vent port 42 in the cover 29 is prevented by the plug 43. Removal of this plug serves to open the main valve.

The seat member 17 is provided with a central boss 44 supported on radial ribs 46. Fixed within this boss is an upward projecting stationary stem 48. The stem 48 projects upward above the valve seat face 19. The outer cylindrical surface 49 of the stem 48 is slidably received within the central cylindrical opening 50 within the guide element 23. This opening serves as a guide for the closure member 21 in moving axially toward and away from the valve seat face 19.

A metering pin 53 is mounted to slide within the vertical bore provided in the upper portion of the stem 48. This pin extends through a vertical bore 55 in the upper portion of the clamping sleeve 24. This metering pin has a restrictor portion 57 provided with a helical groove, and a cylindrical end portion 59. The restrictor portion 57 has a relatively close sliding fit within the bore 55, but the cylindrical portion 59 is of smaller diameter and has considerable clearance within the bore 55, as shown in FIG. 3.

The clearance between the cylindrical surfaces 49 and 50, the hollow sleeve 24, and the bore 55 cooperate to form a supply passage extending axially through the movable closure member 21. When the cylindrical portion 59 of the metering pin 53 is positioned within the bore 55, as shown in FIG. 3, the restriction effect is minimized, and maximum flow takes place into the chamber 31. This flow is greater than the capacity of the vent passage including the pilot valve port 34, and the result is that the increase in pressure in the chamber 31 causes the movable closure member 21 to move toward engagement with the valve seat member 17. This action in turn causes the upper portion of the restrictor 57 to be received in the lower end of the bore 55, thereby restricting the rate of flow through the bore 55. When the flow into the chamber 31 through the bore 55 equals the flow outward through the vent passage including the solenoid valve port 34, the movable closure member 21 reaches a "hydraulic stop" and floats in open pressure-balanced position.

The extent of the valve opening to reach the "hydraulic stop" position may be regulated by means of the adjustable part 60 mounted on the cover 29. The lower end of this part 60 enters the actuating chamber 31 and contacts the upper end of the metering pin 53. Interengaging threads 61 on the adjustable part 60 and the body cover 29 cause the part 60 to move axially when the handle 62 is manually rotated. Spring 61 urges pin 53 upward.

Guiding of the movable closure member 21 is accomplished by employing stem 48 and opening 50 as a guide, and thereby holding surfaces 64 and 65 in concentric relationship.

Resilient means are provided for moving the closure member 21 away from the valve seat member 17 in order to provide for drainage through the valve in either direction. As shown in the drawings, this resilient means comprises a spiral coil spring 67 interposed between the boss 44 on the valve seat member 17 and the guide element 23 on the movable closure member 21. In its free unstressed shape, as shown in FIG. 4, the spring 67 is frustoconical in outline. The spring 67 is free to slide relative to the outer surface 49 of the stem 48. The spring 67 is designed so that its force when fully compressed, as shown in FIG. 5, will be sufficient to overcome the force of the spring 32, as well as the weight of the closure member assembly, so that, when pressure differential across the valve falls below a predetermined level, the force of the spring 67 will move the closure member 21 from the fully-closed position shown in FIG. 5 to the drain position shown in FIG. 6. In this position, the lower portion of the cylindrical surface 65 on the guide element 23 is encompassed by the upper portion of the cylindrical bore of the valve seat member 17, between the fully-closed position of FIG. 5 and the drain position of FIG. 6. The flow passageway provided between the cylindrical surfaces 64 and 65 represents a controlled area passageway. This controlled area passageway is required so that, when system pressure is reapplied, a definite limit is placed on the tendency of the valve to dissipate the available system pressure. Consequently, a positive system pressure can be reestablished with normal system sources. The controlled area passageway provided by the clearance space between surfaces 64 and 65 represents a relatively small percentage of the full open valve area passageway, as shown in FIG. 4. However, in providing for system draining requirements, it is not necessary to provide the same valve control area as is necessary for the irrigation operation.

When the valve is fully open, as shown in FIG. 4, the velocity of the flow through the valve seat 17, as shown by the arrows, tends to hold the spring 67 against the lower face of the guide element 23, where it offers minimum resistance to flow.

When it is desired to drain the system to prevent freezing, or for any other reason, the supply pressure is shut off and the system is opened to drain at the low point. In the event that residual pressure in the system is superior on the discharge side of any valve, this superior pressure acts with the spring 67 to cause valve opening, in that the pressure in the chamber 31 bleeds through the normal supply passage so that the movable valve element opens to allow drainage from the outlet through the inlet, and opening of the solenoid pilot control is not required. If, on the other hand, residual system pressure is superior at any valve inlet, energizing of the solenoid pilot control will bleed chamber 31 through the passage 41, allowing superior pressure to again assist spring 67 to cause valve opening. Once the pressure differential has been equalized, the spring 67 causes the valve to remain in the drain position to permit drainage in either direction.

While the valve has been illustrated and described in an upright position with the closure member 21 movable vertically, the valve will perform normally and accomplish the desired draining action with the stem inclined from the vertical up to 90°. By positioning the valve on its side, the valve drains to the inner diameter of the pipes (not shown) connected to the inlet and outlet.

I claim:

1. In a pressure actuated valve, the combination of: a body having a stationary valve seat member therein provided with a valve seat face, an axially movable closure member having a part thereof engageable with said valve seat face to form a seal, means whereby the closure member forms a wall of a pressure chamber within the body, supply passage means serving to admit fluid pressure into said chamber and thereby move the closure member to closed position in which said closure member engages said valve seat face, means for venting the chamber to permit pressure fluid upstream from the valve seat member to act against the closure member to move it away from said valve seat member to open position, resilient means operatively interposed between the valve seat member and the closure member operable upon predetermined travel of the closure member toward the valve seat member to oppose continued movement of the closure member toward closed position.

2. In a pressure actuated valve, the combination of: a body having a stationary valve seat member therein provided with a valve seat face and having an axial cylindrical surface, an axially movable closure member having a part thereof engageable with said valve seat face to form a seal, said closure member having an element provided with a cylindrical surface slidable with respect to said cylindrical surface of the valve seat member, means whereby the closure member forms a wall of a pressure chamber within the body, supply passage means serving to admit fluid pressure into said chamber and thereby move the closure member to closed position in which said closure member part engages said valve seat face, means for venting the chamber to permit pressure fluid upstream from the valve seat member to act against the closure member to move it away from said valve seat member to open position, one of said cylindrical surfaces encircling the other in said closed position, and being axially spaced therefrom in said open position, and resilient means operatively interposed between the valve seat member and the closure member operable in the absence of fluid pressure to move the closure member to a drain position intermediate said open and closed positions.

3. The combination of claim 2 wherein the resilient means comprises a spiral coil spring substantially frustoconical in outline when unstressed.

4. The combination of claim 2 in which a portion of one cylindrical surface is encircled by the other when the parts are in drain position.

5. The combination of claim 2 wherein a spring is provided in the chamber to move the closure member toward closed position, and wherein said resilient means opposes the action of said spring in moving the closure member to drain position.

6. In a pressure actuated valve, the combination of: a body having a stationary valve seat member therein provided with a horizontal valve seat face and having a vertical cylindrical bore, a vertically movable closure member having a part thereof engageable with said valve seat face to form a seal, said closure member having a guide element provided with an outer cylindrical surface slidable within said cylindrical bore in the valve seat member, means whereby the closure member forms a wall of a pressure chamber within the body, supply passage means serving to admit fluid pressure into said chamber and thereby depress the closure member to closed position in which said closure member part engages said valve seat face, means for venting the chamber to permit pressure fluid upstream from the valve seat member to act against the closure member to lift it away from said valve seat member to open position, said guide element in said closed position extending into said cylindrical bore and in said open position being spaced above the valve seat face, and resilient means operatively interposed between the valve seat member and the closure member operable in the absence of fluid pressure to lift the closure member to a drain position intermediate said open and closed positions.

7. The combination of claim 6 wherein the resilient means comprises a spiral coil spring substantially frustoconical in outline when unstressed.

8. The combination of claim 6 in which the outer cylindrical surface of the guide element is partially received within the cylindrical bore of the valve seat member when the parts are in drain position.

9. The combination of claim 7 wherein the spring encircles a stationary vertical stem fixed relative to the valve seat member, the stem being slidably received in a central opening in said guide element.

10. In a pressure actuated valve, the combination of: a body having an inlet and an outlet and a stationary valve seat member positioned therebetween, said member being provided with a seat face and having a cylindrical bore, an axially movable closure member having a disc engageable with said valve seat face to form a seal, said closure member having a guide element engaging the disc and having an outer cylindrical surface slidable within said cylindrical bore in the valve seat member, means whereby the closure member forms a wall of a pressure chamber within the body, supply passage means serving to admit fluid pressure into said chamber and thereby move the closure member to closed position in which said disc engages said valve seat face, means for venting the chamber to permit pressure fluid upstream from the valve seat to act against the closure member to move it away from said seat to open position, said guide element in said closed position extending into said cylindrical bore and in said open position being axially spaced from the valve seat, said guide element also having a central axial opening positioned radially within said outer cylindrical surface, and axial stem fixed centrally to the valve seat member and slidably received in said opening, the stem extending axially beyond the valve seat face, and resilient means operatively interposed between the stem and the closure member operable in the absence of fluid pressure to move the closure member to a drain position intermediate said open and closed positions.

11. The combination of claim 10 wherein the clearance between said central axial opening and said stem comprises a portion of said supply passage means.

12. The combination of claim 10 wherein the resilient means comprises a spiral coil spring substantially frustoconical in outline when unstressed.

13. The combination of claim 10 in which the outer cylindrical surface of the guide element is partially received within the cylindrical bore of the valve seat member when the parts are in drain position.